United States Patent
Thomas et al.

(10) Patent No.: US 11,227,314 B2
(45) Date of Patent: Jan. 18, 2022

(54) DYNAMIC CONTENT FULFILMENT ASSOCIATED WITH REAL TIME BIDDING

(71) Applicant: International Business Machines Corporation, Armonk, NY (US)

(72) Inventors: Mathews Thomas, Flower Mound, TX (US); Janki Vora, Lewisville, TX (US); Utpal Mangla, Toronto (CA); Amandeep Singh, Dallas, TX (US); Venkatesh Ashok Rao Rao, Natick, MA (US); Sharath Prasad Krishna Prasad, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 16/567,419

(22) Filed: Sep. 11, 2019

(65) Prior Publication Data

US 2021/0073872 A1    Mar. 11, 2021

(51) Int. Cl.
*G06Q 30/02*    (2012.01)

(52) U.S. Cl.
CPC ..... *G06Q 30/0277* (2013.01); *G06Q 30/0275* (2013.01)

(58) Field of Classification Search
None
See application file for complete search history.

(56) References Cited

U.S. PATENT DOCUMENTS

| 6,772,200 | B1 | 8/2004 | Bakshi et al. | |
| 9,715,699 | B1 | 7/2017 | Els et al. | |
| 10,248,973 | B1 | 4/2019 | Buller et al. | |
| 10,650,445 | B1* | 5/2020 | Kirschner | G06Q 30/08 |
| 2008/0167943 | A1 | 7/2008 | O'Neil et al. | |
| 2014/0188611 | A1* | 7/2014 | Wu | G06Q 30/0257 705/14.55 |
| 2015/0142585 | A1* | 5/2015 | Scalise | G06Q 30/0277 705/14.73 |
| 2015/0178786 | A1* | 6/2015 | Claessens | G06Q 30/0269 705/14.66 |

(Continued)

FOREIGN PATENT DOCUMENTS

CN    108647988 A    10/2018

OTHER PUBLICATIONS

Haber, S., Stornetta, W.S. How to time-stamp a digital document. J. Cryptology 3, 99-111 (1991). https://doi.org/10.1007/BF00196791: (Year: 1991).*

(Continued)

*Primary Examiner* — Eric R Netzloff
(74) *Attorney, Agent, or Firm* — Monchai Chuaychoo

(57) ABSTRACT

An approach for creating dynamic content. The approach receives advertiser data associated with activities of one or more advertisers and receives publisher data associated with activities of one or more publishers. The approach manages the one or more DSPs activities associated with the received advertiser data and publisher data. Furthermore, the approach manages the one or more SSPs activities associated with the received advertiser data, publisher data and the one or more DSPs activities and selects one or more advertisement for one or more website. Finally, the approach manages the one or more consumer behaviors associated with the selected one or more advertisement.

17 Claims, 5 Drawing Sheets

(56) References Cited

U.S. PATENT DOCUMENTS

| | | |
|---|---|---|
| 2016/0019598 A1 | 1/2016 | Harrison |
| 2016/0180406 A1* | 6/2016 | Chauhan ............ G06Q 30/0275 |
| | | 705/14.41 |
| 2017/0195747 A1 | 7/2017 | Haberman et al. |
| 2017/0372300 A1* | 12/2017 | Dunlevy ................ G06Q 20/36 |
| 2018/0308134 A1* | 10/2018 | Manning ............ G06Q 30/0275 |
| 2019/0057362 A1* | 2/2019 | Wright .................... G06F 16/27 |
| 2019/0392487 A1* | 12/2019 | Duke ...................... G06N 20/00 |
| 2020/0272619 A1* | 8/2020 | Alferov ................ G06Q 50/265 |

OTHER PUBLICATIONS

Nakamoto, Satoshi. "Bitcoin: A Peer-to-Peer Electronic Cash System" https://bitcoin.org/bitcoin.pdf. Accessed Apr. 24, 2018.: (Year: 2008).*

"Blockchain Ad Tech. The Big Promise of a Bright Future for Digital Advertising", smartyads, Feb. 2018, 11 pages.

"Blockchain technology that will restore confidence in digital advertising", Good Rebels, Feb. 15, 2018, 3 pages.

Chitra, Iyer, "Can Blockchain Tech Change AdTech?", Talking Stack, A Weekly Podcast, Jun. 5, 2018, 7 pages.

Thompson, Jess, "What Is a DSP, SSP and Ad exchange, and how do they fit together?", BANNERCONNECT, <https://www.bannerconnect.net/what-is-a-dsp-ssp-and-ad-exchange/>, Aug. 18, 2017, downloaded on Aug. 11, 2019, 4 pages.

* cited by examiner

DYNAMIC CONTENT FULFILMENT ASSOCIATED WITH REAL TIME BIDDING

BACKGROUND

The present invention relates generally to networking technology, and more particularly to monitoring and facilitating a targeted digital advertisement between vendors and suppliers associated with supply-side and demand-side platforms.

A data management platform (DMP) is a type of software that collects first, second, and third-party data and then organizes the data to help marketers get better marketing results. It is usually used to help target, select, and segment audiences to improve marketing campaigns.

A demand-side platform (DSP) is another type of software in the digital advertisement ecosystem that is used to purchase advertising (e.g., display, video, mobile, social and search ads) in an automated way. A DSP allows advertisers, (i) to buy advertisement inventory across a range of publisher sites, and (ii) target advertisement inventory to individual users based on, for example, user behavior, actions, demographics, location, or previous online activity. Digital publishers make advertisement inventory available through advertisement (ad) exchanges, and DSPs aggregate these exchanges and automatically decide which impressions (i.e., a view or an ad view, is a term that refers to the point in which an ad is viewed once by a visitor, or displayed once on a web page) for an advertiser to buy.

A supply-side platform (SSP) is another type of software in the same ecosystem as DSP, that allows a publisher to sell digital ad impressions via automated auctions. The moniker for "supply side" stems from the fact that people that use an SSP supply the inventory for the ad to appear and be consumed.

SUMMARY

Embodiments of the present invention disclose a computer-implemented method, computer program product and a computer system for dynamic content creation.

The computer-implemented method includes: receiving advertiser data associated with activities of one or more advertisers; receiving publisher data associated with activities of one or more publishers; managing one or more demand side platform (DSP) activities associated with the received advertiser data and publisher data; managing one or more supplier side platform (SSP) activities associated with the received advertiser data, publisher data, and the one or more DSP activities; selecting one or more advertisements for one or more websites; and managing one or more consumer behaviors associated with the selected one or more advertisements.

The computer program product may include one or more computer readable storage media and program instructions stored on the one or more computer readable storage media, the program instructions comprising: program instructions to receive advertiser data associated with activities of one or more advertisers; program instructions to receive publisher data associated with activities of one or more publishers; program instructions to manage one or more demand side platform (DSP) activities associated with the received advertiser data and publisher data; program instructions to manage one or more supplier side platform (SSP) activities associated with the received advertiser data, publisher data, and the one or more DSP activities; program instructions to select one or more advertisements for one or more websites; and program instructions to manage one or more consumer behaviors associated with the selected one or more advertisements.

The computer system may include one or more computer processors; one or more computer readable storage media; program instructions stored on the one or more computer readable storage media for execution by at least one of the one or more computer processors, the program instructions comprising: program instructions to receive advertiser data associated with activities of one or more advertisers; program instructions to receive publisher data associated with activities of one or more publishers; program instructions to manage one or more demand side platform (DSP) activities associated with the received advertiser data and publisher data; program instructions to manage one or more supplier side platform (SSP) activities associated with the received advertiser data, publisher data, and the one or more DSP activities; program instructions to select one or more advertisements for one or more websites; and program instructions to manage one or more consumer behaviors associated with the selected one or more advertisements.

DETAILED DESCRIPTION

Figure 1:
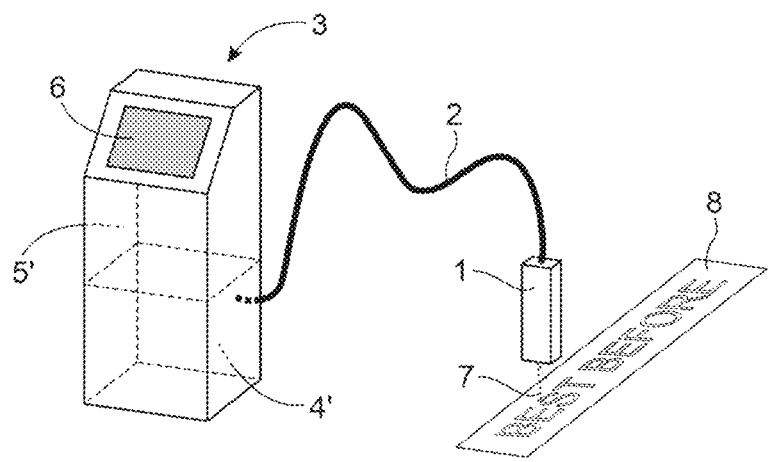
FIG. 1A is a functional block diagram illustrating a topology of a digital media platform environment, generally designated 100A, in accordance with at least one embodiment of the present invention.
FIG. 1B is a functional block diagram illustrating sub-components associated with digital media platform component 111, in accordance with at least one embodiment of the present invention.

Embodiments of the present invention provide an efficient approach of a real time bidding (RTB) system in the field of digital advertising processing between DSP (demand side platform) and SSP (supply side platform), wherein there are collaborations between suppliers within the DMP (data management platform). One of the technical challenges that currently exists in real time bidding is coordinating suppliers to users. Some of the advantages leveraged by embodiments of the present invention can be enumerated by the following: a) multiple suppliers can now fulfill a single ad request and each of them get part of the proceeds; b) suppliers can collaborate with each other in the dynamic content creation process (i.e., ad creation) resulting in more relevant ads provisioned to the consumer; c) multiple ads fulfilled on same slot based on the amount of time a user stays on a page to permit more complex collaborations in ad sales to be fulfilled while simpler ones are displayed first (this also permits optimal ads to be shown and enhances overall user experience); d) bidding will consider a time factor when supplier wants to display ad and duration that ad should be displayed; e) compensation not limited to a single winner of bid and click through but a network of collaborating suppliers with price variations based on selected suppliers; f) ability for demand side to interact with multiple DSPs and winners chosen from multiple DSPs; g) increased power of suppliers compared to earlier systems—suppliers can chose who to collaborate with and who to sell to; and h) real time bidding and dynamic ad updates based on interaction and context from second screen (e.g. a person watching a video on a website and pausing of the video resulting in a new ad due to a higher bid based on additional information).

Other advantages include, but are not limited to: a) content can be any type of content (e.g., multimedia, etc.) and above rules apply (e.g. for video ads, the content can be collaboratively created by the suppliers, and future ads in the video will be put up for bid in real time based on user response and other information); and b) content being shown may be immediately replaced if someone places a higher bid for an ad slot based on information from user interactions, second screen input, etc.

In some embodiments, the system can leverage block chain technology in order to provide a system of truth of tracking and validating complex contracts between suppliers for execution of business rules. Furthermore, block chain technology can be used as a consensus between the parties, bringing further optimization and visibility to the parties involved in the DMP landscape. It is noted that blockchain technology can be leveraged to process settlements on charges between multiple suppliers and advertisers.

In other embodiments, the system can provide advantages including, but not limited, to: a) increased power of suppliers compared to earlier systems—suppliers can chose who to collaborate with and who to sell to; b) use of unique features, such as cached content repositories and templates through the collaboration layer; c) dynamic advertisement updates based on user interactions with an advertisement (portions of ad will be made available for real time bidding); and d) real time bidding and dynamic ad updates based on interaction and context from second screen. The following use case scenario will be used to illustrate the advantages enumerated above. User A logs onto a news website and starts browsing various information. The news site contacts multiple DSP's asking for a bid and provides information it has about User A (e.g. likes to watch news related to cars). Thus, DSP's reach out to multiple SSP's (e.g. SSP1, SSP2 and SSP3). SSP1, SSP2 and SSP3 collaborate and agree that SSP1 will provide the car from Ferrari™, SSP2 will provide the background content from the National Park Services and SSP3 will provide the image of person 1 standing by the vehicle. SSP4 provides a Honda™, while SSP5 provides person 2 standing by vehicle. These are separate from SSP1-SSP3 above. DSP selects the bid from the collaborators. SSP1, SSP2 and SSP5 are reimbursed accordingly. However, User A does not appear to respond to the ad, thus, SSP4 increases the bid. Now, DSP accepts the new bid and replaces the collaborators ad with a new vehicle. User A watches the new ad video and SSP5 dynamically modifies future content in the streaming video based on new information gathered about User A's car preference. Thus, the collaboration between supplier with other suppliers to fulfill the advertisement background can be seen. It is noted that multiple advertisers can get more money depending on the contract between the entities.

In another example, a typical bidding process uses a time factor where the time duration can be, for example, 5 seconds or 30 seconds. However, in an embodiment of the invention, the system allows the bidding process to include other factors such as adding bidding rules (e.g., consensus, optimizer, price, etc.). In yet another example associated with the bidding process, the highest bid normally controls the advertisement duration. However, until information about the consumer (i.e., who is interacting with the advertisement) is known, the only factor for advertisement duration and/or cost to keep the advertisement up is the time element (i.e. duration). The bid for that consumer is kept alive until someone knows more about the consumer. Thus, in an embodiment of the invention, once the habits and preferences of the consumers are known, the system can take that into consideration and raise the bid process. For example, the current fee for a 3 second advertisement goes up after more is known regarding the consumer and in turn, a higher bid can be sought.

In another embodiment, the publisher site is interacted (i.e. visited) by a consumer, Joe. The publisher ascertains what Joe is doing (i.e., interest and viewing habits of Joe). This information is then sent to a DSP. The DSP asks if anyone is interested in providing an advertisement for Joe. The DSP asks around on who wants this ad (i.e., DSP communicates with SSPs). Traditionally, the ad is static and not dynamic. The SSP would pick one supplier and provide the advertisement back to the DSP along with the cost. However, with embodiments of the present invention, the SSP can pick multiple suppliers (assuming those suppliers are willing to collaborate).

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

FIG. 1A is a functional block diagram illustrating a topology of a digital media platform environment, generally designated 100A, in accordance with at least one embodiment of the present invention. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims.

Digital media platform environment 100A includes SSP server 102, DSP server 103, and digital media platform server 110. All (e.g., 102, 103 and 110) elements can be interconnected over network 101.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between digital media platform server 110, SSP server 102, DSP server 103, and other computing devices (not shown) within digital media platform environment 100A. It is noted that other computing devices can include, but is not limited to additional SSP servers, additional DSP servers, and any electro-mechanical devices capable of carrying out a series of computing instructions.

SSP server 102, DSP server 103 and digital media platform server 110 can be a standalone computing device, a management server, a web server, a mobile computing device, or any other electronic device or computing system capable of receiving, sending, and processing data. In other embodiments, digital media platform server 110 can represent a server computing system utilizing multiple computers as a server system, such as in a cloud computing environment. In another embodiment, digital media platform server 110 can be a laptop computer, a tablet computer, a netbook computer, a personal computer (PC), a desktop computer, a personal digital assistant (PDA), a smart phone, or any other programmable electronic device capable of communicating other computing devices (not shown) within 100 via network 101. In another embodiment, digital media platform server 110 represents a computing system utilizing clustered computers and components (e.g., database server computers, application server computers, etc.) that act as a single pool of seamless resources when accessed within digital media platform environment 100.

Digital media platform server 110 includes digital media platform component 111 and data store 116.

Digital media platform component 111 enables the present invention to coordinate and/or organize activities between: i) SSP 102, ii) DSP 103, iii) Publishers and iv) Suppliers. Furthermore, digital media platform component 111 can record, monitor and track blockchain transactions within digital media platform environment 100A.

Data store 116 is a repository for data used by digital media platform component 111. Data store 116 can be implemented with any type of storage device capable of storing data and configuring files that can be accessed and utilized by digital media platform server 110, such as a database server, a hard disk drive, or a flash memory. Data store 116 uses one or more of a plurality of techniques known in the art to store a plurality of information. In the depicted embodiment, data store 116 resides on digital media platform server 110. In another embodiment, data store 116 may reside elsewhere within digital media platform environment 100A, provided that digital media platform component 111 has access to data store 116. Data store 116 may store information associated with, but not limited, to: corpus knowledge of advertisement rules related to co-branding or branding conflicts, real-time bidding processes, block-chain encryption keys, consumer buying trends, digital marketing trends and various macro/micro economic metrics as it relates to consumer spending. Data store 116 can consist of multiple databases and other data associated products (e.g., web server, analytics tools, etc.).

FIG. 1B is a functional block diagram illustrating sub-components associated with digital media platform component 111 in accordance with at least one embodiment of the present invention. In the depicted embodiment, digital media platform component 111 includes SSP component 112, DSP component 113, publisher component 114 and consumer component 115.

Figure 2:
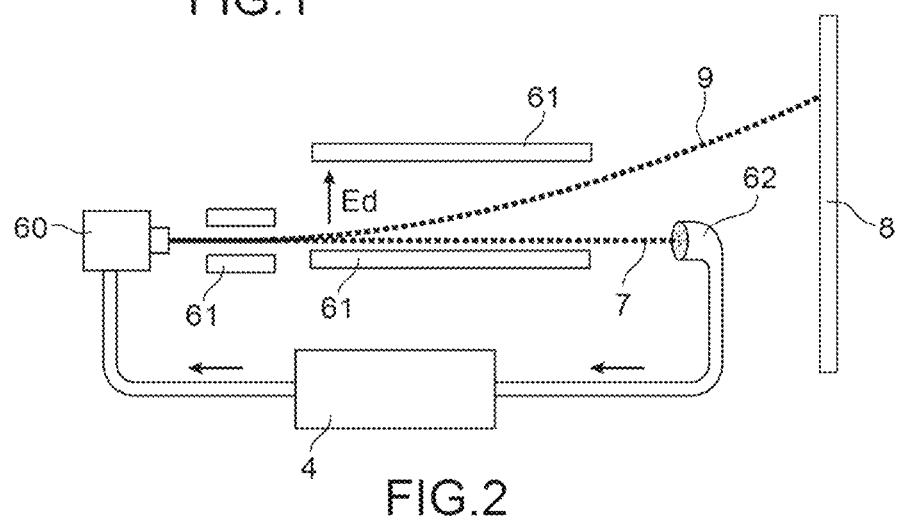
FIG. 2 is a functional block diagram illustrating digital media platform component, generally designated 200, in accordance with at least one embodiment of the present invention.

FIG. 2 is a functional block diagram illustrating a digital media platform component, generally designated 200, in accordance with at least one embodiment of the present invention. In the depicted embodiment, digital media platform component 200 includes single advertiser 202, multiple ad agencies 204, single ad agency 205, supplier collaboration 210, multi-brand content generator 211, multi-brand contract optimizer 212, multi-brand consensus component 213, multiple SSPs 220, single SSP 221, multiple DSPs 230, single DSP 231, publisher 240, digital platform for advertisement 241, ad displayed website 242, consumer 250 and blockchain 260.

Components residing in FIG. 1B and FIG. 2 will be described together in greater detail below to illustrate the interdependency and workflows between different entities.

SSP component 112 of the present invention can coordinate communications and manage workflows between: i) multiple SSPs, ii) ad agencies, iii) advertisers, iv) suppliers, and v) DSPs. SSP component 112 can fulfill an ad's need wherein multiple supplies are sourced. SSP component 112 can monitor communication between the aforementioned entities through the use of persistent agent software located on the servers (belonging to those entities). For example, SSP component 112 can monitor communication (e.g., requests, etc.) from advertisers (i.e., advertisers 202) to multiple ad agencies (i.e., 204) to make ads available to different SSPs (e.g., 220, 221). In another example, SSP component 112 can facilitate various activities (e.g., collaboration, etc.) between one or more SSPs (i.e., 221). In yet another example, SSP component 112 can manage bid transactions between SSPs and suppliers. Furthermore, SSP component 112 can record, update, track and monitor all transactions between the entities using blockchain technology as the record of truth. It is noted that templates for advertisements can be stored and easily retrieved by SSPs through SSP component 112.

DSP component 113 of the present invention can coordinate communications and manage workflows between: i) multiple DSPs, ii) publisher's sites, and iii) multiple SSPs. DSP component 113 can monitor communications and facilitate various activities between the entities through the use of persistent agent software located on the servers (belonging to those entities). For example, DSP component 113 can monitor single DSP 231 accepting a request for an ad from publisher 240. If the single DSP 231 provides a template to break an ad into component parts for 210 to respond, then DSP component 113 can be made aware (i.e., track/monitor) of those activities by the persistent agent (located on the servers belonging to 210 and 230, 231). Furthermore, DSP component 113 can record, update, track and monitor all transactions between the entities (e.g., DSPs, publisher site and SSPs) using blockchain technology as the record of truth. Transactions can include payment between entities.

Publisher component 114 of the present invention can coordinate communications and facilitate and/or manage workflows between: i) publishers' sites, ii) consumers, and iii) multiple DSPs. Publisher component 114 can monitor communication between the entities through the use of persistent agent software located on the servers (belonging to those entities). For example, publisher component 114 can monitor activities (e.g., puts a bid for advertisement) between publisher (i.e., publisher 240) and DSPs (i.e., DSP 230). Furthermore, publisher component 114 can record, update, track and monitor all transactions between the entities (e.g., publisher site, consumers and DSPs) using blockchain technology as the record of truth. Transactions can include payment between entities.

Consumer component 115 of the present invention can coordinate communications and facilitate and/or manage workflows between: i) consumers, and ii) publishers. SSP component 112 can monitor communications between the entities through the use of persistent agent software located on the servers (belonging to those entities). For example, consumer component 115 can monitor activities of a consumer (i.e. consumer 250) while visiting/interacting with websites belonging to a publisher (i.e. publisher 240). Furthermore, consumer component 115 can record, update, track and monitor all transactions between the entities (e.g., consumers and publishers) using blockchain technology as the record of truth. Transactions can include payment between entities.

Generally, the following role for each entity with respect to FIG. 2 is described in further detail below.

Multiple DSPs 230, in the present embodiment, is a demand side platform which accepts requests for an ad from a publisher. Bids can go to multiple DSP's and aggregation will occur for the best (i.e., highest) bid. Additionally, DSPs 230 may provide a template to break an ad into component parts so individual or collaborative suppliers may respond to the bid.

Multiple SSPs 220, in the present embodiment, is a supply side platform which attempts to fulfill the need of an ad. Multiple supplies will be involved in this process of fulfilment.

Ad Agency 204, in the present embodiment, is an advertising agency that provides ad's (full or component pieces) to suppliers so they have content to respond to a bid. Advertisers 202, in the present embodiment, are advertisers who works with the ad agency to determine the best content to sell their products.

Consumer 250, in the present embodiment, is a consumer/user that interacts with websites/webpages. Publisher 240, in the present embodiment, is an entity hosting the site, wherein consumer 250 visits.

Blockchain 260, in the present embodiment, is a subsystem that leverages blockchain technology of digital media platform component 111 that enables participants to securely distribute ad slots to an advertiser or group of advertisers in a fair manner leading to maximum benefit to all participants.

Supplier collaboration 210, in the present embodiment, permits suppliers to collaborate to provide combined parts as a single or combined bid. Supplier collaboration includes the following subcomponents: multi-brand content generator 211, multi-brand contract optimizer 212, and multi-brand consensus component 213.

It is noted that the following three components below provide an improvement to the overall experience by suppliers during supplier collaboration 210. As is further described herein below, multi-brand content generator 211 of the present invention provides the capability of generating one advertisement (e.g., video, photo, etc.) from multiple advertisers (i.e., through their ad agencies). For example, multi-brand content generator 211 can create one photo-based ad by putting together one photo advertisement comprising of: i) one car from Ferrari™, ii) one background from National Park Service and ii) one person wearing Gucci™ clothes.

As is further described herein below, multi-brand contract optimizer 212 of the present invention can optimize contracts between the different advertisers putting a bid together. The ad will be compiled in real time using many suppliers. Each of the suppliers will have to be paid based on agreed contracts optimized for the given situation. The ad provider that provides the largest portion of the content may not be paid the most, but it will be based on criteria such as, the content provider who provides the most impactful content.

As is further described herein below, multi-brand consensus component 213 of the present invention can maintain rules and logic that determine which brands can be displayed together and which brands cannot participate together in a single advertisement. For example, illustrating rules and logic, the Volkswagen™ group consists of multiple brands such as, Audi™ Lamborghini™, Bentley™, Bugatti™, Porsche™, and Ducati™. Thus, multi-brand consensus component 213 has knowledge (e.g., through data store 116, through user input or deep learning, etc.) of this rule (i.e., multiple brands belonging to the same corporate entity structure) and can chose to have a single advertisement comprising of an Audi™ car as well as a Ducati™ bike. In another example, illustrating rules and logic, multi-brand consensus component 213 has knowledge that technology (tech) companies, such as IBM™, often partner with telco telecommunication (telco) companies, such as AT&T™, for many joint go-to-market strategies. Thus, for both IBM™ and AT&T™ to appear in a single advertisement may not run afoul of any existing rules and logic. In yet another example, it is inconceivable that, Pepsi™ and Coke™ will never be in an advertisement together (i.e., afoul of existing rules and logic).

Figure 3:
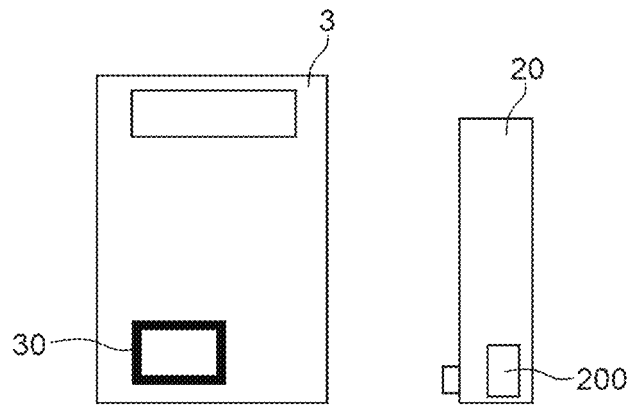
FIG. 3 is a flowchart illustrating the operation of a digital media platform system, generally designated 300, in accordance with at least one embodiment of the present invention.

FIG. 3 is a flowchart illustrating the operation of a digital media platform environment 100, generally designated 300, in accordance with at least one embodiment of the present invention.

Digital media platform component 111 receives data associated with an advertiser (step 302). In an embodiment, digital media platform component 111, through DSP component 113, receives data associated with various activities between the advertiser and multiple ad agencies. For example, advertisers 202 interacts (i.e., arrow 203) with ad agencies (e.g., 204 and 205) to make ads available to different SSPs (i.e., 221).

Digital media platform component 111 receives data associated with publishers (step 304). In an embodiment, digital media platform component 111, through publisher component 114, receives data associated with various activities between website publisher, consumer, and DSP. For example, consumer 250 visits a website and interacts (indirectly) with the web publisher. The publisher requests a bid (in real time) for advertisement (i.e. arrow 242) associated with consumer 250 from DSPs (e.g., 230, 231).

Digital media platform component 111 manages DSP activity (step 306). In an embodiment, digital media platform component 111, through DSP component 113, monitors various activities between the DSPs and SSPs. For example, DSP (e.g., 230, 231) sends out (i.e., arrow 222) bids to SSP (e.g., 220, 221). However, DSP does not merely send a request for content as is the customary manner, but instead, the DSP can request for content in the traditional manner or provide a template that breaks the advertisement into component parts so that multiple suppliers can bid for the component parts of the advertisement and suppliers can respond piecemeal together.

In another embodiment, managing DSP and SSP activity can include one or more of the following steps: a) a publisher requests an advertisement, b) the DSP places a bid for the advertisement, c) SSPs search for suppliers for the advertisement, d) suppliers can collaborate on the advertisement and notify the SSP, e) the SSP responds to the DSP's original bid for advertisement, f) the DSP selects the bid from the SSP, g) the DSP notifies the publisher, and h) the publisher publishes the advertisement. It should be appreciated that the above steps are done in real-time (e.g., in a fraction of a second).

Digital media platform component 111 manages SSP activity (step 308). In an embodiment, digital media platform component 111, through SSP component 112, monitors various activities between the DSPs, suppliers, and SSPs. For example, SSP (e.g., 220, 221) interact with each other if necessary, via the collaboration layer (i.e., 210). This includes agreeing who will provide which component of the ad in real time. The real time bidding process (i.e., arrow 206) can occur between SSPs (i.e., 220), ad agency (i.e., 204), and suppliers. Suppliers may also choose not to collaborate and independently send a component or complete part of the advertisement (i.e., arrow 223 and arrow 225). It is noted that during this step, the following components belonging to supplier collaboration 210 can be invoked: 211, 212 and 213. Additionally, independent SSP or collaborative SSPs can send content to DSP with bids.

Digital media platform component 111 selects an advertisement for the website (step 310). In an embodiment, digital media platform component 111 selects the winning advertisement to be sent to the website. For example, resuming after the bidding request by the DSP, DSP can select content to be posted (i.e., arrow 243) and accepts the appropriate bid. Selection of content can include aggregation of components. The selected aggregated ad is sent to the publisher of the website and the ad is displayed on the website.

Digital media platform component 111 manages consumer behavior to the selected advertisement (step 312). In an embodiment, digital media platform component 111, through consumer component 115, monitors and tracks the feedback from the consumer (i.e., clicking on other advertisements). The feedback for a user can be how a user interacts with the advertisement. Based on the feedback of the user, digital media platform can coordinate/organize DSP, SSP and publishers and change the advertisement for the user. For example, using the car advertisement scenario from earlier, User A is browsing for vehicles. User A does not appear to react to a current ad (i.e., about Ferrari™ with the National Park Service background). Thus, SSP4 increases the bid for a new vehicle (i.e., Honda). User A reacts positively (by clicking on the advertisement) with the Honda™ and National park service background. The interaction between the user and advertisement can be captured by consumer component 115 (i.e., arrow 224). Subsequently, other components such as 112, 113 and 114 can be invoked to provide an effective and efficient use of the advertisement.

The present invention may be a system, a method, and/or a computer program product. The computer program product may include a computer readable storage medium (or media) having computer readable program instructions thereon for causing a processor to carry out aspects of the present invention.

Figure 4:
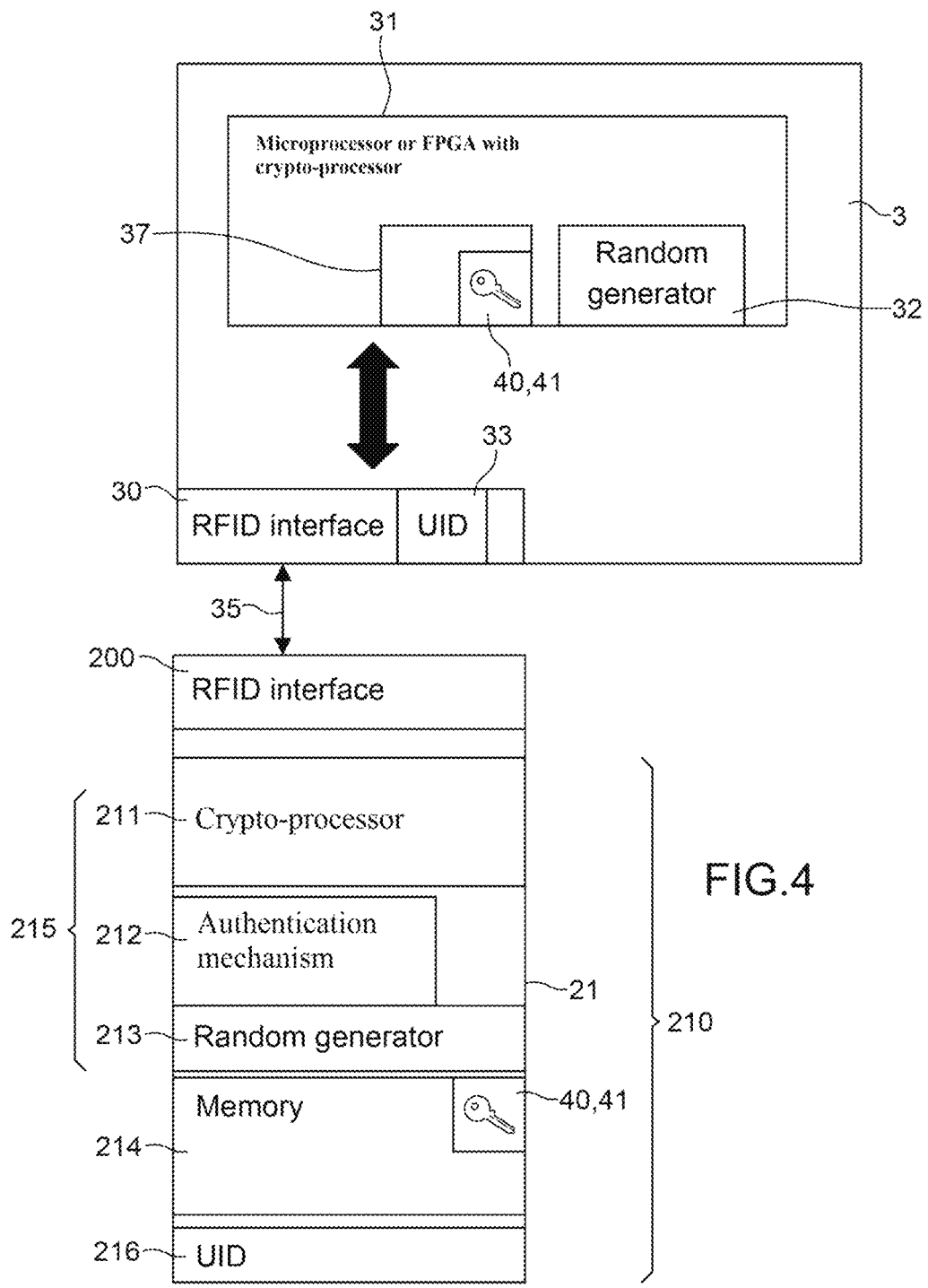
FIG. 4 depicts a block diagram of components of a server computer, generally designated 400, capable of executing the digital media platform system within the digital media platform environment of FIG. 1, in accordance with at least one embodiment of the present invention.
Figure 5A:
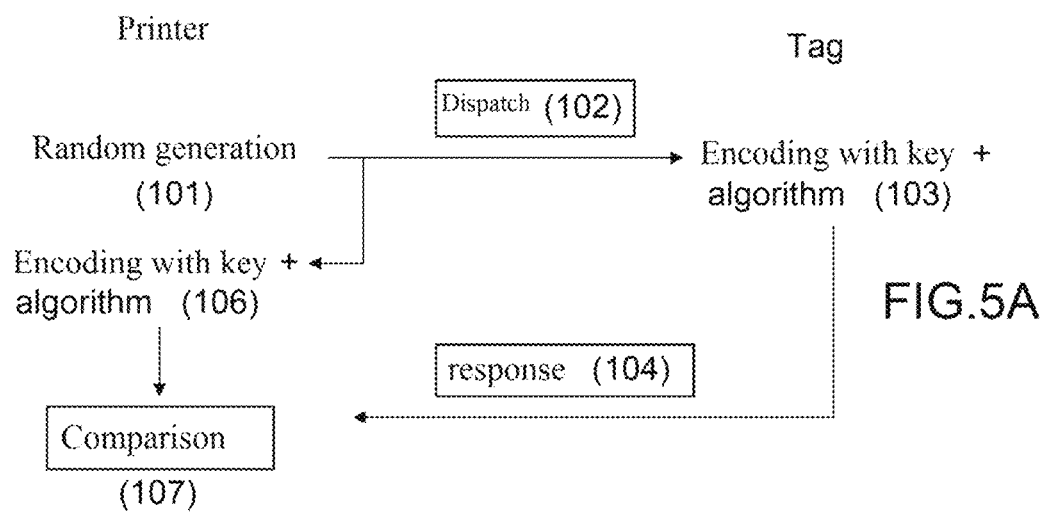
Figure 5B:
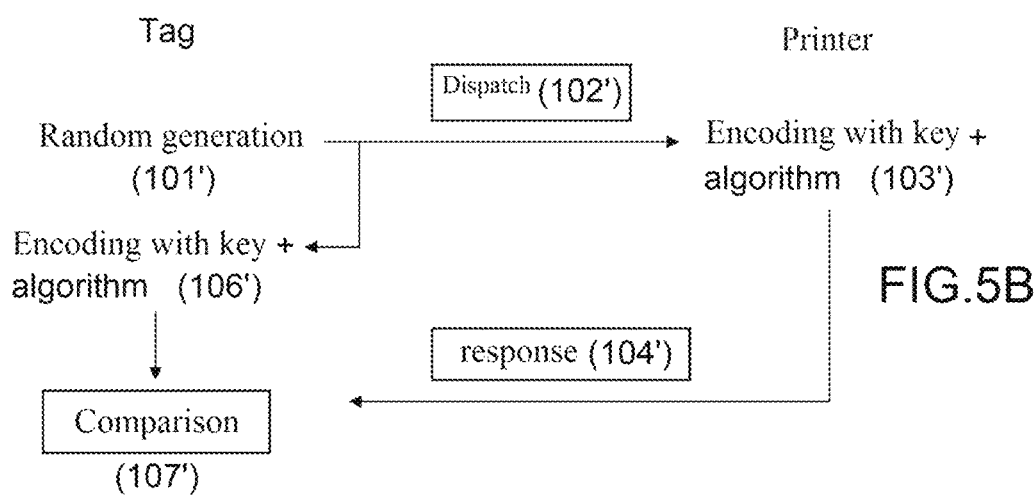
Figure 6A:
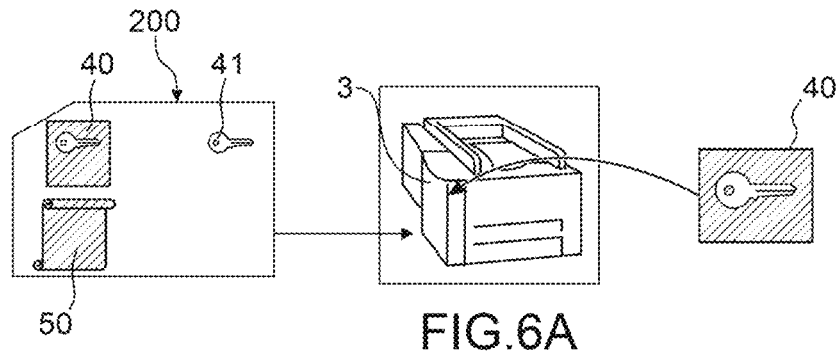
Figure 6B:
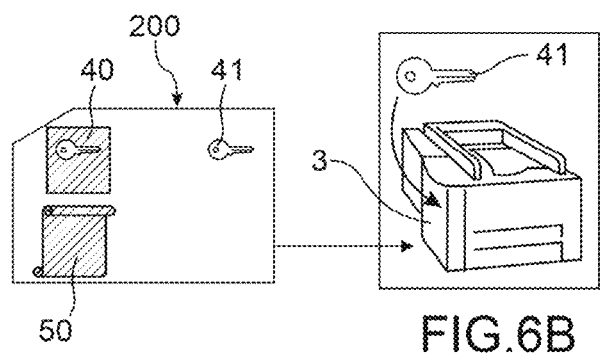
Figure 7:
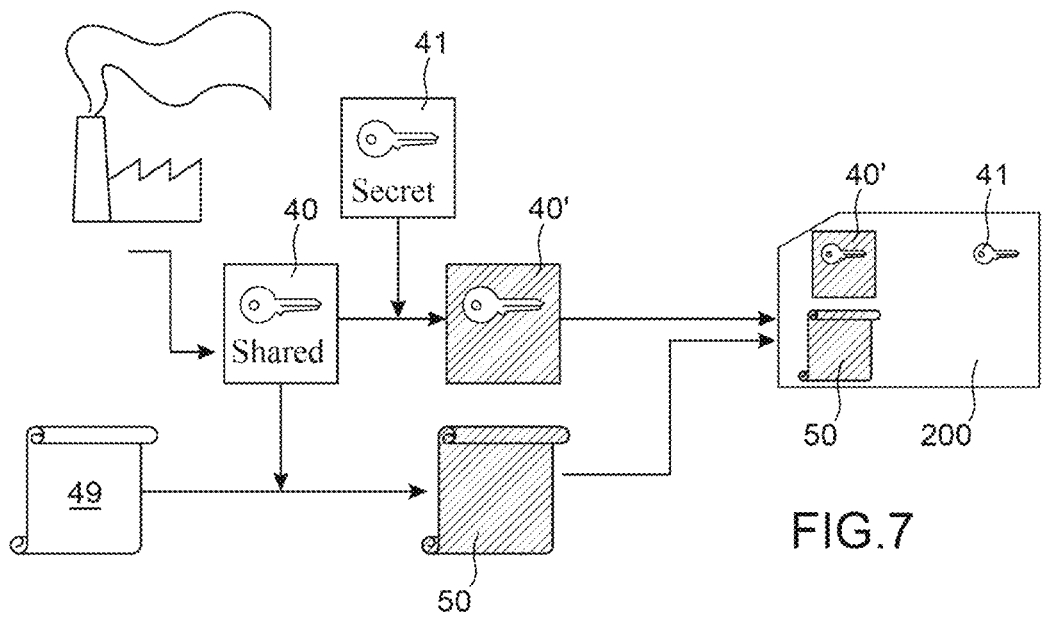
Figure 8A:
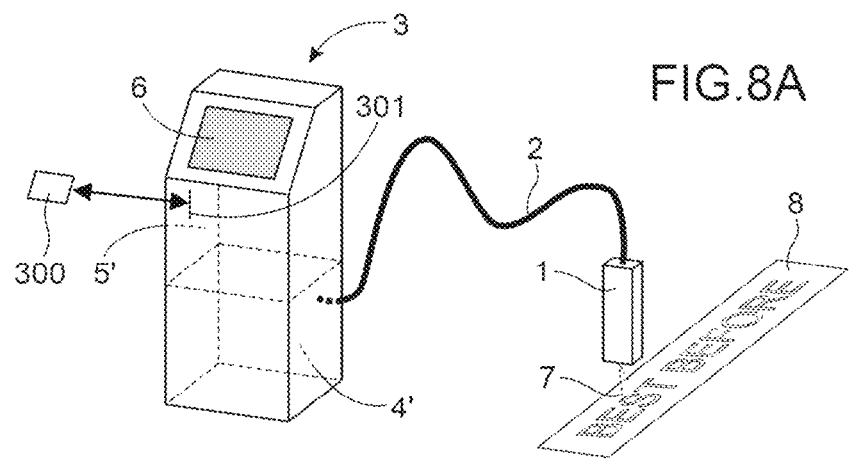
Figure 8B:
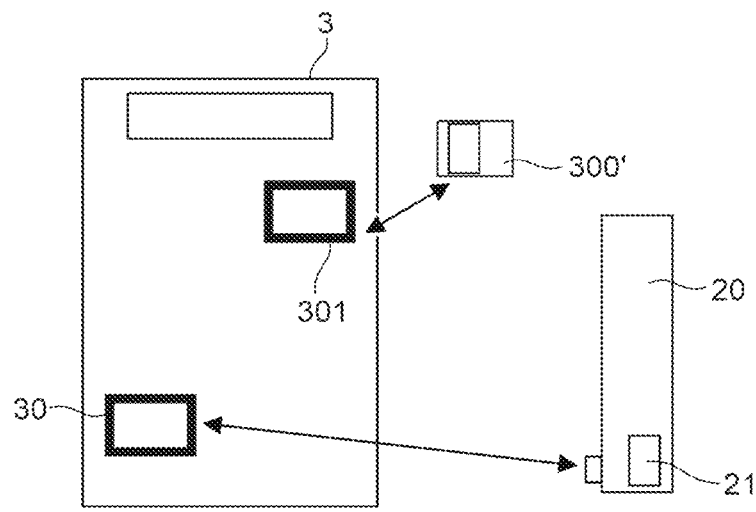

FIG. 4 depicts a block diagram, designated as 400, of components of digital media platform component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Digital media platform component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., digital media platform component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., digital media platform component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for creating dynamic content, the method comprising:
    receiving advertiser data associated with a bid request of one or more advertisers in real time;
    receiving publisher data associated with the bid request of one or more publishers in real time;
    managing one or more DSP (Demand Side Platform) activity associated with the received advertiser data and publisher data in real time;
    determining, in real time and by deep learning, one or more product brand placement based on the received advertiser data and publisher data
    creating, in real time and by deep learning, a multi-brand advertisement based on the one or more product brand placement, wherein the multi-brand advertisement comprises of several brands combined into one single advertisement, further comprises:
        sending one or more templates, through a collaboration layer, from one or more DSP to suppliers, wherein the suppliers collaborate to provide multiple contents for the multi-brand advertisement further comprises:
            the collaboration layer comprises cached content repositories and the one or more templates and wherein the one or more templates further comprises the multiple contents, and
            the suppliers bid for one or more of the multiple contents of the multi-brand advertisement;
        receiving, based on successful bids from the suppliers, the multi-brand advertisement with the multiple contents and;
    optimizing one or more contracts of the one or more advertisers based on most impact content of the multi-brand advertisement and wherein the most impact is paid more than least impact contact;
    managing one or more SSP (Supply Side Platform) activity associated with the received advertiser data, publisher data and the one or more DSP activity;
    selecting the multi-brand advertisement for one or more website; and
    managing one or more consumer behavior associated with the selected the multi-brand advertisement, wherein the one or more consumer behavior comprises of a user viewing the multi-brand advertisement and the user clicking the multi-brand advertisement on a website.

2. The computer-implemented method of claim 1, further comprising:
    creating trackable entries associated with one or more DSP activities and the one or more SSP activities using blockchain technology; and
    creating trackable entries associated with one or more SSP activities using blockchain technology.

3. The computer-implemented method of claim 1, wherein managing one or more DSP activity, further comprising:
    receiving a publisher request from a publisher regarding an advertisement;
    instructing the one or more DSP to place a bid for the advertisement, wherein the one or more SSP searches for one or more suppliers;
    instructing the one or more suppliers to collaborate on the advertisement;
    receiving a notification from the one or more suppliers that the collaboration has ended;
    instructing one or more SSP to respond to the bid;
    receiving a bid response from the one or more SSP;
    instructing the one or more DSP to select the bid based on the one or more SSP; and
    notifying publisher of the bid and the publishers publishes the ad.

4. The computer-implemented method of claim 1, wherein managing one or more SSP activity, further comprising:
    instructing the one or more SSP to collaborate with the one or more SSP, ad agencies and suppliers; and
    receiving a component of the advertisement from the suppliers.

5. The computer-implemented method of claim 1, further comprising:
    creating trackable entries associated with the one or more consumer behavior using blockchain technology.

6. The computer-implemented method of claim 1, wherein managing one or more consumer behavior associated with the one or more advertisement, further comprising:
    monitoring the one or more consumer behavior, wherein an interaction associated with the consumer behavior is tracked;
    sending data based on the user behavior to the one or more DSP, one or more SSP and Publisher;
    creating a new advertisement based on the monitored user behavior; and
    responsive to creating the new advertisement, publishing the new advertisement.

7. A computer program product for creating dynamic content, the computer program product comprising:
    one or more computer readable storage media and program instructions stored on the one or more computer readable storage media, the program instructions comprising:
        program instructions to receive advertiser data associated with a bid request of one or more advertisers in real time;
        program instructions to receive publisher data associated with the bid request of one or more publishers in real time;
        program instructions to manage one or more DSP activity associated with the received advertiser data and publisher data in real time;

program instructions to determine, in real time and by deep learning one or more product brand placement based on the received advertiser data and publisher data;
program instructions to create, in real time and by deep learning, a multi-brand advertisement based on the one or more product brand placement, wherein the multi-brand advertisement comprises of several brands combined into one single advertisement:
program instructions to send one or more templates, through a collaboration layer, from one or more DSP to suppliers, wherein the suppliers collaborate to provide multiple contents for the multi-brand advertisement further comprises:
the collaboration layer comprises cached content repositories and the one or more templates and wherein the one or more templates further comprises the multiple contents, and
the suppliers bid for one or more of the multiple contents of the multi-brand advertisement;
program instructions to receive, based on successful bids from the suppliers, the multi-brand advertisement with the multiple contents and;
program instructions to optimize one or more contracts of the one or more advertisers based on most impact content of the multi-brand advertisement and wherein the most impact is paid more than least impact contact;
program instructions to manage one or more SSP (Supply Side Platform) activity associated with the received advertiser data, publisher data and the one or more DSP activity;
program instructions to select the multi-brand advertisement for one or more website; and
program instructions to manage one or more consumer behavior associated with the selected multi-brand advertisement, wherein the one or more consumer behavior comprises of a user viewing the multi-brand advertisement and the user clicking the brand advertisement on a website.

8. The computer program product of claim 7, further comprising:
program instructions to create trackable entries associated with one or more DSP activities and the one or more SSP activities using blockchain technology; and
program instructions to create trackable entries associated with one or more SSP activities using blockchain technology.

9. The computer program product of claim 7, wherein program instructions to manage one or more DSP activity, further comprising:
program instructions to receive a publisher request from a publisher regarding an advertisement;
program instructions to instruct the one or more DSP to place a bid for the advertisement, wherein the one or more SSP searches for one or more suppliers;
program instructions to instruct the one or more suppliers to collaborate on the advertisement;
program instructions to receive a notification from the one or more suppliers that the collaboration has ended;
program instructions to instruct one or more SSP to respond to the bid;
program instructions to receive a bid response from the one or more SSP;
program instructions to instruct the one or more DSP to select the bid based on the one or more SSP; and
program instructions to notify publisher of the bid and the publishers publishes the ad.

10. The computer program product of claim 7, wherein program instructions to manage one or more SSP activity, further comprising:
program instructions to instruct the one or more SSP to collaborate with the one or more SSP, ad agencies and suppliers; and
program instructions to receive a component of the advertisement from the suppliers.

11. The computer program product of claim 7, further comprising:
program instructions to create trackable entries associated with the one or more consumer behavior using blockchain technology.

12. The computer program product of claim 7, wherein program instructions to manage one or more consumer behavior associated with the one or more advertisement, further comprising:
program instructions to monitor the one or more consumer behavior, wherein an interaction associated with the consumer behavior is tracked;
program instructions to send data based on the user behavior to the one or more DSP, one or more SSP and Publisher;
program instructions to create a new advertisement based on the monitored user behavior; and
responsive to program instructions to create the new advertisement, program instructions to publish the new advertisement.

13. A computer system for creating dynamic content, the computer system comprising:
one or more computer processors;
one or more computer readable storage media;
program instructions stored on the one or more computer readable storage media for execution by at least one of the one or more computer processors, the program instructions comprising:
program instructions to receive advertiser data associated with a bid of one or more advertisers in real time;
program instructions to receive publisher data associated with the bid of one or more publishers in real time;
program instructions to manage one or more DSP activity associated with the received advertiser data and publisher data in real time;
program instructions to determine, in real time and by deep learning one or more product brand placement based on the received advertiser data and publisher data;
program instructions to create, in real time and by deep learning, a multi-brand advertisement based on the one or more product brand placement, wherein the multi-brand advertisement comprises of several brands combined into one single advertisement:
program instructions to send one or more templates, through a collaboration layer, from one or more DSP to suppliers, wherein the suppliers collaborate to provide multiple contents for the multi-brand advertisement further comprises:
the collaboration layer comprises cached content repositories and the one or more templates and wherein the one or more templates further comprises the multiple contents, and
the suppliers bid for one or more of the multiple contents of the multi-brand advertisement;

program instructions to receive, based on successful bids from the suppliers, the multi-brand advertisement with the multiple contents and;

program instructions to optimize one or more contracts of the one or more advertisers based on most impact content of the multi-brand advertisement and wherein the most impact is paid more than least impact contact;

program instructions to manage one or more SSP (Supply Side Platform) activity associated with the received advertiser data, publisher data and the one or more DSP activity;

program instructions to select multi-brand advertisement for one or more website; and program instructions to manage one or more consumer behavior associated with the selected multi-brand advertisement, wherein the one or more consumer behavior comprises of a user viewing the multi-brand advertisement and the user clicking the me multi-brand advertisement on a website.

14. The computer system of claim 13, further comprising:
program instructions to create trackable entries associated with one or more DSP activities and the one or more SSP activities using blockchain technology; and
program instructions to create trackable entries associated with one or more SSP activities using blockchain technology.

15. The computer system of claim 13, wherein program instructions to manage one or more DSP activity, further comprising:

program instructions to receive a publisher request from a publisher regarding an advertisement;

program instructions to instruct the one or more DSP to place a bid for the advertisement, wherein the one or more SSP searches for one or more suppliers;

program instructions to instruct the one or more suppliers to collaborate on the advertisement;

program instructions to receive a notification from the one or more suppliers that the collaboration has ended;

program instructions to instruct one or more SSP to respond to the bid;

program instructions to receive a bid response from the one or more SSP;

program instructions to instruct the one or more DSP to select the bid based on the one or more SSP; and program instructions to notify publisher of the bid and the publishers publishes the ad.

16. The computer system of claim 13, wherein program instructions to manage one or more SSP activity, further comprising:

program instructions to instruct the one or more SSP to collaborate with the one or more SSP, ad agencies and suppliers; and program instructions to receive a component of the advertisement from the suppliers.

17. The computer system of claim 13, further comprising:
program instructions to create trackable entries associated with the one or more consumer behavior using blockchain technology.

* * * * *